(12) United States Patent
Kazmaier et al.

(10) Patent No.: US 7,172,712 B2
(45) Date of Patent: Feb. 6, 2007

(54) PREPARATION OF MICROMULTICHROMAL SPHERES

(75) Inventors: Peter M. Kazmaier, Mississauga (CA); Barkev Keoshkerian, Thornhill (CA); George Liebermann, Mississauga (CA); Naveen Chopra, Oakville (CA); Hadi K. Mahabadi, Toronto (CA); Jaan Noolandi, Mississauga (CA); Francisco E. Torres, San Jose, CA (US)

(73) Assignee: Xerox Corporation, Stamford, CT (US)

( * ) Notice: Subject to any disclaimer, the term of this patent is extended or adjusted under 35 U.S.C. 154(b) by 379 days.

(21) Appl. No.: 10/249,483

(22) Filed: Apr. 14, 2003

(65) Prior Publication Data

US 2004/0202862 A1    Oct. 14, 2004

(51) Int. Cl.
*B29D 11/00*  (2006.01)
*G02B 26/00*  (2006.01)

(52) U.S. Cl. .................. 264/1.7; 264/4.1; 264/437; 264/438; 264/343; 359/296

(58) Field of Classification Search ............... 264/1.1, 264/1.7, 437, 438, 343, 4.7, 4.1; 428/403; 359/296
See application file for complete search history.

(56) References Cited

U.S. PATENT DOCUMENTS

| 4,126,854 | A | 11/1978 | Sheridon |
|---|---|---|---|
| 4,143,103 | A | 3/1979 | Sheridon |
| 5,037,716 | A | 8/1991 | Moffat |
| 5,262,098 | A | 11/1993 | Crowley et al. |
| 5,344,594 | A | 9/1994 | Sheridon |
| 5,389,945 | A | 2/1995 | Sheridon |
| 5,717,514 | A | 2/1998 | Sheridon |
| 5,815,306 | A | 9/1998 | Sheridon et al. |
| 5,989,629 | A | 11/1999 | Sacripante et al. |
| 6,054,071 | A | 4/2000 | Mikkelsen, Jr. |
| 6,067,185 | A | 5/2000 | Albert et al. |
| 6,097,531 | A | 8/2000 | Sheridon |
| 6,241,921 | B1 * | 6/2001 | Jacobson et al. .......... 264/1.36 |
| 6,396,621 | B1 | 5/2002 | Sheridon |
| 6,441,946 | B1 | 8/2002 | Sheridon |
| 6,445,490 | B1 | 9/2002 | Chopra et al. |
| 6,515,649 | B1 | 2/2003 | Albert et al. |
| 6,663,802 | B2 * | 12/2003 | Sacripante .................. 264/1.7 |
| 7,130,107 | B2 * | 10/2006 | Liu et al. .................... 359/296 |

* cited by examiner

*Primary Examiner*—Mathieu D. Vargot
(74) *Attorney, Agent, or Firm*—Eugene O. Palazzo; Oliff & Berridge, PLC

(57) ABSTRACT

A method of making a multichromal sphere includes the steps of preparing a composition of at least (1) a matrix material and (2) at least two sets of particles, each of the sets of particles having a color different from at least one of another of the sets of particles and a segregation (e.g., an electrical or magnetic) property different from at least one of another of the sets of particles, encapsulating the composition within a shell to form an encapsulated sphere, immobilizing the encapsulated sphere in a manner to restrict at least rotation of the encapsulated sphere, subjecting the immobilized encapsulated sphere to an external field associated with the segregation property different among the sets of particles, under conditions in which the sets of particles are able to migrate within the matrix material, thereby producing color segregation in the immobilized encapsulated sphere, and solidifying the matrix material while substantially maintaining the color segregation. In the multichromal spheres, each of the sets of particles is segregated within a separate segment of the solidified matrix material of the core on the basis of the different segregation property.

15 Claims, No Drawings

PREPARATION OF MICROMULTICHROMAL SPHERES

BACKGROUND OF INVENTION

1. Field of Invention

The present invention relates to methods for preparing micron sized multichromal beads, in particular micron sized bichromal beads, of the type for use in gyricon or electric paper displays (e.g., reimageable paper).

2. Description of Related Art

Reimageable displays, also called gyricon displays, twisting-ball displays, rotary ball displays, particle displays, dipolar particle light valves, reimageable paper, etc., offer a technology for making a form of electric paper. Briefly, a reimageable display is an addressable display made up of a multiplicity of optically anisotropic spheres, each of which can be selectively rotated to present a desired face to an observer. For example, a reimageable display can incorporate spheres each having two distinct hemispheres, one black and the other white (and thus the spheres are bichromal), with each hemisphere having a distinct electrical characteristic (e.g., zeta potential with respect to a dielectric fluid) so that the spheres are electrically as well as optically anisotropic.

In one example of a reimageable display, the bichromal spheres are embedded in a sheet of optically transparent material, such as an elastomer layer, that contains a multiplicity of spheroidal cavities and is permeated by a transparent dielectric fluid, such as a plasticizer. The fluid-filled cavities accommodate the spheres, one sphere per cavity, so as to prevent the spheres from migrating within the sheet. A sphere can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the gyricon spheres rotate in response thereto, thereby presenting either a black or white side surface to the viewer. See, for example, U.S. Pat. Nos. 5,262,098, 5,344,594, 5,389,945, 5,717,514, 5,815,306, 5,989,629, 6,097,531, 6,396,621 and 6,441,946, each incorporated herein by reference.

U.S. Pat. No. 6,445,490, incorporated herein by reference, describes another type of bichromal gyricon display sphere. This patent describes a particulate encapsulated gyricon element that includes a gyricon sphere encapsulated within a shell that also contains a dielectric fluid in which the gyricon sphere is able to rotate. Display elements such as electric paper may then be readily derived by coating the encapsulated gyricon elements upon any suitable substrate. This gyricon element has the advantage of not requiring a separate matrix with fluid-filled cavities.

While various reimageable display sheets are known, methods of making the gyricon spheres for such displays could still be improved. Existing methods for forming gyricon spheres include:

U.S. Pat. No. 6,054,071, incorporated herein by reference, describes forming twisting balls (10) for an electric-paper display from a polarizable material and encapsulated in a protective shell (12). The balls (10) are first disposed between first and second electrodes (14, 16) that generate an electric field. The electric field polarizes each ball (10), transforming each into a dipole electret having a first and second charged poles. At least one colorant (20) is then externally applied to each of the balls (10) to obtain multichromal balls such that the charged poles are distinct from each other. The polarized multichromal balls may then be used in fabricating an electric-paper display by encapsulating the balls (10) in an array such that each ball is capable of rotating in response to a selectively applied electric field. See the Abstract. It is also described at column 5, lines 9–47 that the balls may have a core of a dye of one color and a colorant of a different color, with the colorant moving to one side of the ball under the influence of an electric field.

U.S. Pat. No. 5,344,594, incorporated herein by reference, describes a method of forming hemispheric bichromal balls, including the steps of bringing together two streams of differently colored hardenable liquids for forming a single side-by-side bichromal stream, expelling the single side-by-side bichromal stream into a fluid as one or more free jets whose forward ends becomes unstable and break up into droplets which form into spherical balls, each of the balls comprising hemispheres of differently colored hardenable liquid, and finally hardening the balls.

U.S. Pat. No. 5,262,098, incorporated herein by reference, describes a method similar to that described in U.S. Pat. No. 5,344,594. This reference further describes, in FIGS. 8 and 9, that an electric field may be applied during formation of the balls in order to prevent premature collision of the balls. This field is thus applied while the balls are moving, and therefore cannot be used to arrange colored particles within the balls.

The aforementioned methods of making gyricon spheres have several drawbacks. For example, it is difficult to consistently achieve smaller sizes of gyricon spheres by these methods. Known methods of making gyricon spheres typically form gyricon spheres of about 100 microns in diameter at a minimum. However, high resolution applications require that gyricon spheres have an average diameter on the order of 50 microns or less.

Moreover, the known methods of making gyricon spheres often result in a high number of unusable spheres, i.e., spheres in which the colors are not properly distributed, in which no core at all is present, etc. The methods thus have large inefficiencies.

Thus, it is desired to develop a novel method of making gyricon spheres that improves and/or addresses some or all of the aforementioned drawbacks of the known methods.

SUMMARY OF THE INVENTION

In a first aspect, the invention includes a method of making a multichromal sphere, comprising preparing a composition comprising at least (1) a matrix material and (2) at least two sets of particles, each of the sets of particles having a color different from at least one of another of the sets of particles and a segregation property different from at least one of another of the sets of particles; encapsulating the composition within a shell to form an encapsulated sphere; immobilizing the encapsulated sphere in a manner to restrict at least rotation of the encapsulated sphere; subjecting the immobilized encapsulated sphere to an external field associated with the segregation property different among the sets of particles, under conditions in which the sets of particles are able to migrate within the matrix material, thereby producing color segregation in the immobilized encapsulated sphere; and solidifying the matrix material while substantially maintaining the color segregation.

By this method, multichromal spheres, particularly bichromal spheres, may be efficiently and effectively made. The method is also advantageous in enabling production of consistently small sized multichromal spheres, for example on the order of 50 microns or less in diameter.

In a further aspect, the invention includes a method of making a reimageable display sheet in which the multichromal spheres made by the aforementioned method are incorporated into or onto a sheet material.

In a still further aspect, the invention includes multichromal spheres comprising a core encapsulated within a shell, wherein the core comprises a solidified matrix material containing therein at least two sets of particles, each of the sets of particles having a color different from at least one of another of the sets of particles and an electrical or magnetic property different from at least one of another of the sets of particles, and wherein each of the sets of particles is segregated within a separate segment of the solidified matrix material on the basis of the different electrical or magnetic property.

DETAILED DESCRIPTION OF PREFERRED EMBODIMENTS

As used herein, the term "multichromal" refers to the sphere being capable of exhibiting more than one color to an observer depending on which portion of the sphere has been rotated to be viewed by the observer. In a most preferred embodiment of the invention, the spheres are bichromal, i.e., capable of exhibiting two colors, typically black and white. In typical bichromal spheres of the invention, one half of the sphere is black in color and the other half is white, an observer seeing only one of these colors at a time depending on which half of the sphere is rotated to be seen by the observer. However, it is contemplated that the spheres may contain more than two different colors, and hence the use of the term "multichromal."

In the method of making a multichromal sphere of the present invention, a first step in the process is preparing a composition comprising at least (1) a matrix material and (2) at least two sets of particles, each of the sets of particles having a color different from at least one of another of the sets of particles and an electrical or magnetic property different from at least one of another of the sets of particles.

The composition may be prepared by any suitable method known in the art for bringing a matrix material and at least two sets of particles together without restriction. The components may be brought together in the preparation in any desired order without restriction. As an example of a suitable preparation method, mention may be made of simple mixing of the matrix material and the sets of particles.

As used herein, the term "matrix material" is used to refer to any material that may be acted upon so as to be solidified in forming the core of the sphere. The term thus refers to not only a material itself, for example a polymer or wax that may be cooled below its melting temperature to be solidified, but also to precursors of a material, for example monomers or oligomers that are solidified by polymerization. Thus, waxes, polymers, monomers, oligomers, and polymers derived from monomers and/or oligomers are all "matrix materials" as that term is used herein.

In a first embodiment, the composition utilizes a matrix material comprising at least one polymerizable monomer or oligomer. In this regard, any suitable polymerizable monomer or oligomer may be used without restriction. As but a sample list of possible polymerizable monomers or oligomers, mention may be made of acrylates, methacrylates, styrenes and dienes.

The polymerizable monomers or oligomers typically have a viscosity at room temperature that permits the sets of particles to be able to migrate therein. However, if the sets of particles are not able to migrate within the monomer or oligomer at room temperature, then the material may be heated to a temperature below the melting temperature of the shell but sufficient to establish a condition under which the sets of particles are able to migrate within the matrix material.

In this first embodiment, the solidifying of the at least one polymerizable monomer or oligomer matrix material comprises polymerizing the at least one polymerizable monomer or oligomer. Polymerization may be effected by any suitable method. For example, the polymerization may be effected by applying light, high temperature, ultrasonic or other form of initiation of polymerization to the composition. To assist in the polymerization, an initiator may optionally be included in the matrix material of the composition.

The composition may also include therein at least one fluid having low solubility with the solidified matrix material. The fluid is preferably substantially transparent and substantially clear (colorless) so as not to block the colors of the multichromal sphere. Moreover, the fluid preferably is not affected by application of an electric or magnetic field.

By "low solubility with the solidified matrix material" is meant that upon solidification of the matrix material, for example by polymerization, the fluid is substantially insoluble with the solidified matrix material such that the fluid separates from the solidified matrix material. This has the desirable effect of causing the fluid to concentrate around the periphery of the solidified core so that the core is separated from the shell by the fluid. The core is thereby capable of rotating within the shell to display the different colors of the core. The low solubility fluid, however, may be, and preferably is, miscible with the pre-solidified material of the matrix, for example the pre-polymerized monomers and/or oligomers. This makes it possible to readily encapsulate the composition including the fluid. The fluid is then forced out of the composition upon solidification of the matrix material as discussed above.

Suitable fluids include, for example, dibutyl phthalate, any plasticizer fluid, partially fluorinated fluids such as, for example, 3M HFE 7100, a partially fluorinated hydrocarbon made by 3M, ISOPAR L or ISOPAR M, which are aliphatic hydrocarbons made by Ashland Chemicals, partially fluorinated hydrocarbons made by Halocarbon Products Inc. or FREON TF, a partially fluorinated polyethylene, oils such as, for example, silicon oils, vegetable oils such as, for example, soybean oil and coconut oil, triglyceride fluids such as, for example, tributyrin and tricaproin, fully fluorinated fluids such as, for example, perfluorooctane, aromatic organic solvents such as, for example, benzene, toluene, or xylene, deionized water, mixtures thereof, etc. Mention may also be made of the materials listed in U.S. Pat. No. 6,067,185 beginning at column 16, line 17, incorporated herein by reference.

To permit the solidified core to rotate within the shell, the fluid is preferably present in the composition in an amount of, for example, about 10 to about 75, preferably about 20 to about 50, percent by weight of the composition.

In a second embodiment, the matrix material comprises at least one wax or polymer having a low melting temperature, i.e., a melting temperature less than a melting temperature of the shell. In this regard, the waxes or polymers preferably have a melting temperature of from, for example, about 30° C. to about 150° C.

Suitable examples of waxes include, for example, any waxes from the class of polypropylenes, polyethylenes, chlorparaffins, carnuba waxes and the like, and specific examples such as SUPERSLIP 6530, POLYSILK 14, and JONCRYL 74. Suitable examples of polymers include, for example, polymethacrylates, polyacrylates, polystyrenes, polydienes and the like.

In this second embodiment, the waxes or polymers are solid at room temperature, and thus the sets of particles are fixed therein so as to not be able to migrate within the matrix material. However, during formation of the multichromal spheres, and in particular during application of an external field such as an electric or magnetic field, it is desired to have the different sets of particles migrate to separate portions of the sphere. To accomplish this, it is necessary to establish a condition permitting the sets of particles to migrate within the matrix material. In this embodiment, such is accomplished by heating the composition to a temperature above the melting temperature of the matrix material and below the melting temperature of the shell. This has the effect of melting the matrix material and thus lowering the viscosity of the material to an extent sufficient to permit the particles to migrate within the matrix material under the influence of the applied field, without destroying the encapsulated sphere since the shell is not melted.

Following the migration of the sets of particles, the matrix material is then solidified by cooling the matrix material from the temperature above the melting temperature of the matrix material to a temperature below the melting temperature of the matrix material, and in particular cooling the sphere back down to room temperature.

In a third embodiment, the matrix material comprises at least one polymerizable monomer or oligomer that polymerizes into a low melting polymer, i.e., a polymer having a melting temperature below a melting temperature of the shell. The melting temperature preferably is within the range of from, for example, about 30° C. to about 150° C. This embodiment thus incorporates features of the first two embodiments discussed above.

In this embodiment, the at least one polymerizable monomer or oligomer is first polymerized into the low melting polymer having a melting temperature below a melting temperature of the shell prior to, during or subsequent to subjecting the immobilized encapsulated sphere to the external field associated with the segregation property different among the sets of particles. Preferably, polymerization to achieve the low melting polymer is conducted prior to applying the external field, i.e., prior to effecting migration of the sets of particles within the matrix material of the core.

If polymerization is effected prior to or during application of the external field, the matrix of the core becomes solid at room temperature. As in the second embodiment discussed above, it will then be necessary to heat the sphere to a temperature above the melting temperature of the polymerized matrix material and below the melting temperature of the shell in order to establish a condition under which the sets of particles are able to migrate within the matrix material of the core. Cooling of the sphere to a temperature back below the melting temperature of the polymerized matrix, e.g., to room temperature, will solidify the core matrix and thereby fix the migrated particles in place in the core.

If polymerization is effected following application of the external field, and thus following the migration of the sets of particles in the matrix of the core, it may not be necessary to apply heat to establish a condition under which migration of the sets of particles can be effected. The post-migration polymerization has the effect of solidifying the matrix material and fixing the migrated particles in place in the core.

In each of the foregoing embodiments, the matrix material may comprise, for example, from about 10 to about 95, preferably from about 20 to about 80, percent by weight of the composition. Each of the at least two sets of particles may comprise, for example, from about 1 to about 40, preferably from about 5 to about 25, percent by weight of the composition. However, higher or lower amounts of the matrix material and particles may be used as desired or appropriate, without limitation. Most preferably, each set of differently colored particles comprises about 1 to about 20 percent by weight of the composition.

In addition to the matrix material and particles, the compositions may contain any other suitable additives such as, for example, initiators, dispersion aids, surfactants, etc. Specific examples of such additives may include, for example, OLOA 371C (Chevron) and SOLSPERSE (Avecia).

As the sets of particles in the composition, at least two different sets of particles are to be used. By this is meant that each of the sets of particles used in the composition should have a color different from at least one of another of the sets of particles, as well as have a segregation property different from at least one of another of the sets of particles.

By different segregation property is meant that different sets of particles possess some different property that allows for the different sets of particles to be migrated to different portions within the sphere through exploitation of the different property, preferably via application of an external field associated with that property. Examples of suitable segregation properties include, for example, an electrical property or a magnetic property, although this list is not exhaustive and any other appropriate segregation property may also be employed. Thus for example, a first set of particles may possess a different electric charge or potential from a second set of particles, thereby enabling the different sets of particles to be migrated differently through application of an electrical field. As another example, a first set of particles may possess a different magnetic polarity from a second set of particles, thereby enabling the different sets of particles to be migrated differently through application of a magnetic field.

As the colored particles, any suitable colored particle may be used. Examples include, for example, neat pigments, particles, and dyed or laked pigment/polymer composite particles, such as particles described in U.S. Pat. No. 6,515, 649, incorporated herein by reference. The particles may either possess the different segregation property by virtue of the materials intentionally selected, or the different segregation property may be created therein, for example by inclusion of appropriate additives.

In each case, the different sets of particles are caused to migrate to a separate portion of the sphere through application of a field, e.g., an externally applied field, that is associated with the property different among the sets of particles. By this is meant that the field applied is of the same type as the type of the property difference. Thus, if the property different among the sets of particles is an electrical property, the field applied would need to be an electric field, and if the property different among the sets of particles is a magnetic property, the field applied would need to be a magnetic field, in order to effect the desired migration of the sets of particles within the sphere.

Once the composition is prepared, the composition is then encapsulated within a shell. Preferably, the shell is a resinous or polymeric material. The shell preferably has a high melting temperature at least for those embodiments in which the matrix material of the core comprises a low melting material. The shell may have a melting temperature of, for example, at least about 150° C., and preferably of about 150° C. to about 400° C. or more. Such a shell thus has heat resistance.

The shell may thus be any suitable material. The shell may be a polymer derived from two monomers that can be dissolved, respectively, in two mutually immiscible solvents (such as, for example, organic solvents and water). This enables the polymer to be formed at the interface of the two solvents via interfacial condensation polymerization.

Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly (ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly (ester-urethane) in an interfacial reaction, or an amine terminated amide prepolymer can be copolymerized with a diisocyanate to produce a poly(urea-amide) copolymer. Epoxy monomers or oligomers such as EPIKOTE 819 can also be added to copolymerize into the shell as strengthening agents. Various polyfunctional shell monomers, such as triamines, triisocyanates, and triols can be employed in small quantities as crosslinking agents to introduce rigidity and strength into the shells. Shell polymers can also be formed by the reaction of aliphatic diisocyanates, such as meta-tetramethylene diisocyanate and a polyamine, reference for example the U.S. Pat. No. 5,037,716, incorporated herein by reference in its entirety.

Most preferably, the polymer shell material is comprised of a polyamide (from, e.g., diacid chloride and diamine monomers), a polyester (from, e.g., diacid chloride and diol monomers), a polyurea (from, e.g., diisocyanate and diamine monomers), a polyurethane (from, e.g., diisocyanate and diol monomers) or mixtures thereof. The diacid chloride monomers and diisocyanate monomers may be dissolved in an organic phase, while the diamine and diol monomers may be dissolved in an aqueous phase.

Any suitable method may be used in encapsulating the core composition with the shell without limitation. However, for efficiencies in processing, known encapsulation or microencapsulation techniques such as coacervation, interfacial polymerization, emulsion polymerization, dispersion polymerization, suspension polymerization precipitation, phase separation, solvent evaporation, in situ polymerization, seeded emulsion polymerization, emulsion aggregation, etc., may be used. In such methods, the shell material is formed by precipitating or polymerizing the shell material out of solution and around dispersed droplets/particles of the core material.

An advantage of such encapsulating techniques is that smaller sized encapsulated spheres can be obtained. Although spheres of the present invention may have any size, for example of from about 5 to about 1,000 microns, the present invention is very capable of producing very small sized spheres, for example having sizes on the order of about 5 to about 100 microns, preferably from about 5 to about 50 microns, in diameter. These smaller sized spheres find particular utility in forming high resolution reimageable sheets.

Once the encapsulated spheres are obtained, they are immobilized against rotation using any suitable means or device. For example, the encapsulated spheres may be placed on a conveyor of any suitable design, or placed on or in any other suitable device. Further, the encapsulated spheres may be dispersed within a removable binder, for example a water soluble binder, which may be removed from the encapsulated spheres in subsequent processing.

The significance of immobilizing the encapsulated spheres is to prevent any rotation of the spheres when the external electric or magnetic field is applied. This allows the external field to effect migration of the sets of particles within the core of the sphere. Thus, the sets of particles are migrated to different portions of the sphere, resulting in the multichromal nature of the end spheres. If the encapsulated spheres were able to rotate during application of the external field, the migration and segregation of the sets of particles may not be adequately achieved, and the color segregation in the end particles may thus be poor.

Once immobilized against at least rotation, and under conditions in which the sets of particles are able to migrate within the matrix material, the immobilized spheres are subjected to the external field associated with the segregation property different among the sets of particles as discussed above. As a result, color segregation in the immobilized encapsulated sphere is achieved from the sets of particles having different colors being migrated to different portions of the sphere.

By way of example, in a bichromal sphere, a first set of particles is black and a second set of particles is white, the black and white sets of particles differing in either or both an electrical or a magnetic property. When the immobilized spheres are subjected to the electric or magnetic field associated with the electrical or magnetic property different among the sets of particles, the black particles are made to migrate to one half of the sphere while the white particles are made to migrate to the other, opposite half of the sphere. A bichromal sphere exhibiting white on one side and black on the other side would thus be achieved.

If more than two sets of different particles are present, appropriate manipulation of the application of the electric and/or magnetic field may be undertaken to appropriately segregate the multiple sets of particles to different portions within the sphere. As one example, the strength of the electric field as applied to different portions of the immobilized spheres may be used to differently manipulate particles having different electrical properties. Also, both an electric field and a magnetic field might be applied together, thereby differently manipulating sets of particles having different electrical and magnetic properties (e.g., the magnetic field affects some but not all of the sets of particles, while the electric field affects the remaining sets of particles).

When the different sets of particles have been adequately migrated within the sphere to achieve the multichromal effect, the core matrix is then solidified to fix the sets of colored particles in place within the core. As discussed extensively above, this solidification may be achieved by, for example, polymerizing the core matrix material and/or cooling the core matrix material to a temperature below its melting temperature.

The solidification preferably occurs while the color segregation is substantially maintained. This may be done, for example, by continuing to apply the external field during the solidification of the core matrix. As a result, the sets of particles will not be able to migrate further before the core matrix is solidified and the sets of particles are fixed in place.

The encapsulated spheres of the invention thus are multichromal spheres comprising a core encapsulated within a shell, wherein the core comprises a solidified matrix material containing therein at least two sets of particles, each of the sets of particles having a color different from at least one of another of the sets of particles and an electric or magnetic property different from at least one of another of the sets of particles, and wherein each of the sets of particles is segregated within a separate segment of the solidified matrix material on the basis of the different electrical or magnetic property.

In a preferred embodiment, the multichromal sphere further comprises a fluid between the shell and core that permits rotation of the core within the shell. This achieves an encapsulated core that is ready for use as a reimageable element, i.e., once applied to or in any supporting sheet, the spheres may be manipulated by application of an appropriate external (e.g., electrical or magnetic) field to cause rotation of the core within the sphere and thereby display the desired color of the sphere to an observer.

Reimageable or gyricon displays employing bichromal or multichromal spheres are well known in the art, and need not be illustrated for an understanding of the present invention. Examples of these reimageable sheets may be found in, for example, U.S. Pat. Nos. 6,441,946 and 6,445,490.

In a first embodiment, the encapsulated spheres do not include a fluid within the shell that permits rotation of the core within the shell. In this embodiment, the spheres may be used in a conventional reimageable display by incorporating the multichromal spheres into a binder and forming a sheet therefrom, and then swelling the binder of the sheet with a swelling agent.

For example, as explained in U.S. Pat. No. 6,441,946, incorporated herein by reference in its entirety, the encapsulated spheres are embedded in a sheet of optically transparent binder material, such as an elastomer layer, that contains a multiplicity of spheroidal cavities and is permeated by a transparent fluid that may be of the same type discussed above that may be encapsulated within the shell. Each of the spheres is located within a cavity of the transparent binder. The cavities have a diameter that is slightly larger than the diameter of the spheres so that the spheres have rotational freedom with limited translational freedom. Filling the voids between the spheres and the cavities is the optically transparent fluid. The fluid-filled cavities accommodate the spheres, one per cavity, so as to prevent the spheres from migrating within the sheet. A sphere can, however, be selectively rotated within its respective fluid-filled cavity, for example by application of a spatially limited electric or magnetic field, so as to present a desired segment of the sphere to an observer viewing the surface of the sheet.

The sheet thus includes a distribution of the spheres. Each sphere is surrounded within a cavity of the binder by a transparent fluid.

The sheet may be formed by thoroughly mixing the spheres with an uncured (liquid), optically transparent material, for example, an uncured elastomer such as Dow Corning SYLGARD 184. The optically transparent material is then cured, such as by rapid heating to an elevated temperature. The rotating elements will be embedded in this binder and refrained from either rotational or translational movement. Following curing of the binder, the sheet is placed in contact with the fluid for a period of time for the binder to absorb the fluid and reach an equilibrium point in such absorption. When the cured binder is placed in contact with the fluid, the fluid is absorbed by the binder resulting in a swelling thereof. The spheres are made of a material that does not readily absorb the fluid, with the result that the swelling of the binder creates the cavities around the spheres. The voids or cavities are filled with the fluid and this structure allows easy rotation of the spheres while permitting very limited translation of the spheres.

The optically transparent binder need not be an elastomer and in lieu thereof may be a rigid plastic such as polyethylene, polystyrene, PLEXIGLAS, etc.

In a second embodiment, if the spheres do not already contain the fluid within the shell of the sphere as discussed above, the spheres may be subjected to a further encapsulation process, along the same lines as discussed above for the original encapsulation of the sphere, in order to further encapsulate the sphere in a shell with the fluid between the outer shell and the previously encapsulated sphere.

If the spheres already contain the fluid therein, or are made to contain the fluid as discussed immediately above, these fluid-containing encapsulated spheres may then be used to form a reimageable display as in U.S. Pat. No. 6,445,490, incorporated herein by reference in its entirety. Thus, these spheres can be used to form display elements that comprise one or more of the foregoing spheres upon a substrate. The substrate may be of the same type of material as discussed above for the binder of the reimageable sheet having the spheres therein. The substrate may be a flexible material/sheet such as, for example, paper, a polymer or an elastomer. The spheres may be sandwiched between two substrates, if desired.

The spheres may be coated upon the surface of the substrate by any suitable means, for example by spraying or painting, and may be attached thereto by any suitable means, for example through the use of an adhesive on the surface of the substrate or a flexible polymer binder applied with the spheres. Alternatively, the spheres may be incorporated into the binder of the sheet as discussed above.

The display elements so achieved can then be made to operate as conventionally known in the art, for example by bringing the display into association with an external field, such as for example an electric or magnetic field, that can cause the spheres within the display element to appropriately individually rotate so as to overall display a desired image.

Although the invention has been described with reference to specific preferred embodiments, it is not intended to be limited solely thereto. Rather, those having ordinary skill in the art will recognize that variations and modifications may be made therein which are within the spirit of the invention and within the scope of the claims.

What is claimed is:

1. A method of making a multichromal sphere, comprising:

preparing a composition comprising at least (1) a matrix material and (2) at least two sets of particles, each of the sets of particles having a color different from at least one of another of the sets of particles and a segregation property different from at least one of another of the sets of particles;

encapsulating the composition within a shell to form an encapsulated sphere; immobilizing the encapsulated sphere in a manner to restrict at least rotation of the encapsulated sphere;

subjecting the immobilized encapsulated sphere to an external field associated with the segregation property different among the sets of particles, under conditions in which particles of the sets of particles migrate within the matrix material, thereby producing color segregation in the immobilized encapsulated sphere; and following producing the color segregation, solidifying the matrix material while substantially maintaining the color segregation, wherein the matrix material comprises at least one polymerizable monomer or oligomer that polymerizes into a polymer having a melting temperature below a melting temperature of the shell, wherein the at least one polymerizable monomer or oligomer is polymerized into the polymer having a melting temperature below a melting temperature of the shell prior to or during subjecting the immobilized encapsulated sphere to the external field associated with the segregation property different among the sets of particles, wherein the conditions in which the particles of the sets of particles migrate within the matrix material comprise a temperature above the melting temperature of the polymerized matrix material and below the melting temperature of the shell, and wherein the solidifying of the polymerized matrix material comprises cooling the polymerized matrix material from the temperature above the melting temperature of the polymerized matrix material to a temperature below the melting temperature of the polymerized matrix material.

2. The method according to claim 1, wherein the composition further comprises at least one fluid having low solubility with the solidified matrix material.

3. The method according to claim 2, wherein the solidifying forms a core comprised of the polymerized matrix material and the at least two sets of particles, the core separated from the shell by the fluid so that the core is capable of rotating within the shell.

4. The method according to claim 2, wherein the fluid is an oil.

5. A method of making a multichromal sphere, comprising:
preparing a composition comprising at least (1) a matrix material and (2) at least two sets of particles, each of the sets of particles having a color different from at least one of another of the sets of particles and a segregation property different from at least one of another of the sets of particles;
encapsulating the composition within a shell to form an encapsulated sphere;
immobilizing the encapsulated sphere in a manner to restrict at least rotation of the encapsulated sphere;
subjecting the immobilized encapsulated sphere to an external field associated with the segregation property different among the sets of particles, under conditions in which particles of the sets of particles migrate within the matrix material, thereby producing color segregation in the immobilized encapsulated sphere; and
following producing the color segregation, solidifying the matrix material while substantially maintaining the color segregation,
wherein the matrix material comprises at least one wax or polymer having a melting temperature less than a melting temperature of the shell, wherein the conditions in which the particles of the sets of particles migrate through the at least one wax or polymer matrix material comprise a temperature above the melting temperature of the at least one wax or polymer matrix material and below the melting temperature of the shell, and wherein the solidifying of the at least one wax or polymer matrix material comprises cooling the at least one wax or polymer matrix material from the temperature above the melting temperature of the at least one wax or polymer matrix material to a temperature below the melting temperature of the at least one wax or polymer matrix material.

6. The method according to claim 1, wherein the encapsulating of the composition within a shell to form an encapsulated sphere comprises forming the shell around the composition by interfacial polymerization or coacervation.

7. The method according to claim 1, wherein the external field applied is an electric field and the segregation property different among the sets of particles is an electrical property.

8. The method according to claim 1, wherein the external field applied is a magnetic field and the segregation property different among the sets of particles is a magnetic property.

9. A method of making a reimageable sheet, comprising:
forming multichromal spheres in accordance with the method of claim 1;
incorporating the multichromal spheres into a binder and forming a sheet; and, if the multichromal spheres are not encapsulated within a fluid, swelling the binder of the sheet with a swelling agent.

10. A method of making a reimageable sheet, comprising:
forming multichromal spheres in accordance with the method of claim 1;
if the multichromal spheres are not encapsulated within a fluid, further encapsulating the multichromal spheres in an outer shell containing therein a fluid; and
incorporating the multichromal spheres into or onto a sheet material.

11. The method according to claim 1, wherein the matrix material comprises about 10 to about 95 percent by weight of the composition and wherein each of the at least two sets of particles comprises about 1 to about 20 percent by weight of the composition.

12. The method according to claim 5, wherein the external field applied is an electric field and the segregation property different among the sets of particles is an electrical property, or wherein the external field applied is a magnetic field and the segregation property different among the sets of particles is a magnetic property.

13. A method of making a reimageable sheet, comprising:
forming multichromal spheres in accordance with the method of claim 5;
incorporating the multichromal spheres into a binder and forming a sheet; and, if the multichromal spheres are not encapsulated within a fluid, swelling the binder of the sheet with a swelling agent.

14. A method of making a reimageable sheet, comprising:
forming multichromal spheres in accordance with the method of claim 5;
if the multichromal spheres are not encapsulated within a fluid, further encapsulating the multichromal spheres in an outer shell containing therein a fluid; and
incorporating the multichromal spheres into or onto a sheet material.

15. The method according to claim 5, wherein the matrix material comprises about 10 to about 95 percent by weight of the composition and wherein each of the at least two sets of particles comprises about 1 to about 20 percent by weight of the composition.

* * * * *